United States Patent [19]

Himmel

[11] 4,158,507
[45] Jun. 19, 1979

[54] LASER MEASURING SYSTEM FOR INSPECTION

[75] Inventor: David P. Himmel, Dallas, Tex.

[73] Assignee: Recognition Equipment Incorporated, Dallas, Tex.

[21] Appl. No.: 819,311

[22] Filed: Jul. 27, 1977

[51] Int. Cl.² ............................................. G01B 11/24
[52] U.S. Cl. ................................ 356/376; 250/237 G; 356/371
[58] Field of Search ...................... 356/120, 167, 1–2, 356/4–5, 156; 250/237 R, 237 G

[56] References Cited

U.S. PATENT DOCUMENTS

| 3,364,813 | 1/1968 | McKinney | 356/167 |
| 3,573,849 | 4/1971 | Herriot et al. | 250/237 G |
| 3,975,102 | 8/1976 | Rosenfeld et al. | 356/167 |

FOREIGN PATENT DOCUMENTS

| 2113522 | 9/1972 | Fed. Rep. of Germany | 356/120 |
| 189605 | 7/1967 | U.S.S.R. | 356/120 |

Primary Examiner—John K. Corbin
Assistant Examiner—Wm. H. Punter
Attorney, Agent, or Firm—John E. Vandigriff

[57] ABSTRACT

A laser measuring system for industrial inspection having a laser producing a narrow beam of coherent light which is focused by telescope onto an article. The focused beam of light from the telescope is directed by a scanning means across the article at a known rate. The light reflected from the article is focused by an imaging lens offset from the scanning means onto an optical grating which is provided with alternate transparent and opaque bars. The collected light which passes through the transparent bars of the optical grating is sensed by a photomultiplier detector. A processor which sees the output of the photomultiplier detector determines the time interval between selected points of the output signal of the photomultiplier detector. As the scanning beam moves across the article it causes the laser spot observed by the photomultiplier to traverse the surface faster or slower depending on whether the scanning is proceeding up a portion of the surface of the article or down, respectively. Thus, the reflected light traverses the optical grating at a slower or faster rate and, therefore, the time interval measured by the processor between the selected points on the output of the detector increases as the scanning beam moves up the surface and decreases as the scanning moves down the surface. The processor provides an output directly related to the contour of the article which can be stored and compared with the contour of a master article or prototype.

5 Claims, 6 Drawing Figures $\Delta t$ = MEASURED TIME DIFFERENCE
$\Delta h = (v\Delta t - \delta) \tan\theta$

LASER MEASURING SYSTEM FOR INSPECTION

BACKGROUND OF THE INVENTION

1. Field of the Invention

The present invention relates to a laser measuring system for industrial inspection in which a laser beam is scanned across the surface of an article and, more particularly, the present invention relates to a laser measuring system for industrial inspection which collects light of a scanning beam reflected from the surface of an article in an imaging lens which focuses the reflected light onto a optical grating for determining a contour of the surface of the article.

2. The Prior Art

Reference is made to U.S. Pat. No. 3,975,102 issued to Rosenfeld et al. on Aug. 17, 1976 and entitled "Scanning Photoelectric Autocollimator." Rosenfeld shows and describes an apparatus which is adapted to measure the surface profile of some specific objects utilizing a coherent light source and a two dimensional photoelectric position sensor. The beam of coherent light is directed onto a rotating set of mirrors which provide a raster scan which is directed toward the article to be scanned. The beam is reflected and directed through a polarization beam splitter onto the position sensor. The location of the beam on the position sensor is utilized by a processor to determine any irregularities in the contours of the object. The surface being scanned must be of a concave or convex nature or some other known shape such that lenses are provided which allow the beam directed at the surface and the beam reflected therefrom to coincide.

Rosenfeld and the other constructions known in the prior art do not show a system in which a laser beam is scanned across an article and a lens collects diffuse reflected light from the article surface and focuses that collected light onto an optical grating having alternate transparent and opaque bars.

SUMMARY OF THE INVENTION

In accordance with the present invention a coherent light source such as a gas laser produces a narrow beam of coherent light which is directed through a telescope located along the beam adjacent to the light source. The coherent light beam is directed by the telescope onto a scanning means which can be, for example, a scanning mirror attached to a servo motor. The scanning mirror is driven by the servo motor to pivot through an arc. Thus, the angular relationship between the coherent light beam and the scanning mirror cooperate to form a scanning beam, the scanning beam is the light of the coherent light beam reflected from the scanning mirror. The scanning beam is directed by the scanning mirror across an article about which it is desired to have information concerning the contour of dimensions thereof.

The diffuse light, which is produced by the scanning beam, reflected from the article is collected by an imaging lens positioned to collect light about a central axis. The imaging lens is positioned to collect reflected light from the article throughout the arc of the scanning means. The imaging lens focuses the collected light onto an optical grating which has alternate transparent and opaque bars. The collected and demagnified light which passes through the transparent bars of the optical grating is received in and responded to by a light sensor such as a photomultiplier detector. The relationship between the scanning means, laser telescope, and optical grating is such that the light collected by the imaging lens traverses the optical grating perpendicular to the bars thereon as the scanning beam traverses the article. Further, the angular relationship between the axis of the imaging lens and the location of the scanning beam at the mid point of the scan produced by the scanning means is preferably approximately 45°.

The output of the light sensing means is connected to a processor which receives the output of the detector for the purpose of deriving information concerning the contour of the article therefrom. The processor identifies or locates certain specific points or conditions within the output of the light sensor, for example, the peaks of the signal or the transition from low to high of the AC portion of the signal. Thus, the changing output of the detector, which represents the focused collected light moving across the bars of the optical grating, is utilized to determine the length of time required for the focused collected light to pass across one transparent bar and one opaque bar of the optical grating. The time required for the focused collected light to pass across the pair of bars is in turn a function of the contour of the article. For example, as the scanning beam moves up (increasing in altitude), the collected light moves across the optical grating at a slower rate than the focused collected light moves across the grating when the surface of the article (contour) is flat. The processor determines the length of time between the points identified within the output of the detector and, therefore, the length of time the collected light directed toward the optical grating requires to pass across one pair of adjacent bars, i.e., one transparent and one opaque bar of the optical grating.

The processor also receives information from the position sensor located on the servo motor or scanning mirror of the scanning means. Positional information provided could be a rate of angular movement or an instantaneous measurement of the angle between the scanning beam and some reference. Thus, the processor can relate the time intervals measured to the angle of the scanning beam as related to some reference. The output of the processor concerning the time intervals can be stored in the storage means and the stored contour represented by the intervals can be compared at a later time to a master article or prototype. The time intervals for the prototype are stored in same storage means. The position information obtained from the scanning means can be stored along with the time intervals calculated by the processor in order that the contour can be mapped at a later time.

In one aspect of the invention the article is moved at a slow speed as compared with the scanning rate so that a three dimensional measurement of the contour of the surface of the article can be obtained.

As set forth above, the angular relationship between the center of the arc of the scanning beam is at an approximately 45° angle to the reflected light collected by the imaging lens. In other words if the article is placed on a reference surface which will be utilized for the placement of articles to be measured, the center of the arc is at a 45° angle to the reflected light collected by the imaging lens for that particular location on the arc of the scan. The light collected by the imaging lens for a particular point of the scan is, in order to be collected, reflected only a few degrees about an axis from the reference surface to the imaging lens. This axis is the central axis of the imaging lens.

It should be appreciated that various prisms and mirrors can be utilized to alter the placement of the components of the laser measuring system described herein.

DESCRIPTION OF THE PREFERRED EMBODIMENT

Figure 1:
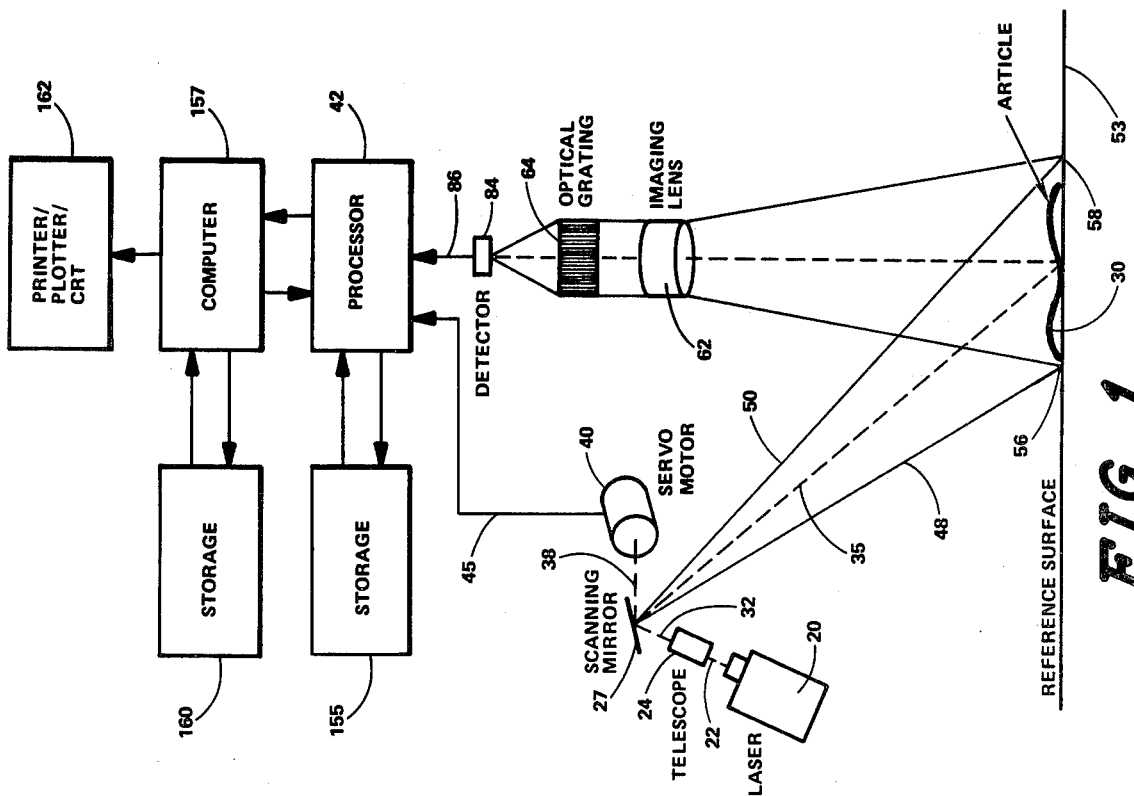
FIG. 1 is a diagrammatic view of a laser measuring system for industrial inspection constructed according to the present invention.

The laser measuring system for industrial inspection as shown in FIG. 1 has a coherent light source or laser 20 such as a gas laser. The laser directs a beam of light (shown by the dotted line 22) outward through a telescope 24 onto a scanning mirror 27. The laser can be a helium-neon type which has a continuous output. The function of the telescope 24 is to focus the laser beam onto a article 30 and control the beam convergence for maximum depth of focus with the desired spot size. The focused beam 32 is reflected by a scanning mirror 27 to form a scanning beam 35. Thus, the focused beam 32 is deflected or directed by the pivoting of the scanning mirror to generate the scanning beam.

The scanning mirror 27 is connected through a shaft 38 (shown pictorially herein) to a motor 40. The motor 40 should generally be of a servo type connected to insure proper pivoting of the scanning mirror. The motor is driven by circuitry (not shown) well known in the art to produce a pivoting of the scanning mirror at a constant rate over a certain range of degrees as desired. The motor of course would not have to be attached directly through a shaft to the scanning mirror but could be driven through various gears or other apparatus as known in the art. Information concerning the position of the scanning mirror is supplied to a processor 42 through line 45. Line 45 could be connected, for example, to a potentiometer attached to shaft 38 or be the output of a logic circuit which provides a scan start pulse on another line (not shown) and the angular velocity of the scanning mirror through line 45.

As shown in FIG. 1 solid lines 48 and 50 are the boundaries of the arc through which scanning beam 35 travels. Article 30 rests on a reference surface 53 and laser 20, telescope 24, and scanning mirrors 27 are located offset from article 30. Line 48 and line 50 form an angle of approximately 30°. The telescope 24 directs the beam onto the area along the pivot axis of the scanning mirror 27.

As shown in FIG. 1 the extreme positions of the scanning beam 35 as shown by line 48 and 50 are such that the extreme position shown by line 48 intersects the reference surface at point 56 and the extreme position shown by line 50 intersects the reference surface 53 at point 58. Thus, the article for which a two dimensional scan is desired must be placed on the reference surface 53 between points 56 and 58 such as article 30 shown in FIG. 1. Of course, if it is desired to scan only a portion of an article 30 then only that portion need be placed between points 56 and 58.

A portion of the diffused light reflectance from article 30 is focused by an imaging lens 62 onto an optical grating 64. It is the diffuse reflectance (or reflected light) and not the specular reflectance (or mirror reflectance) which is collected and focused by the imaging lens. The imaging lens demagnifies the reflected light at a ratio of about 5 to 1.

Figure 5:
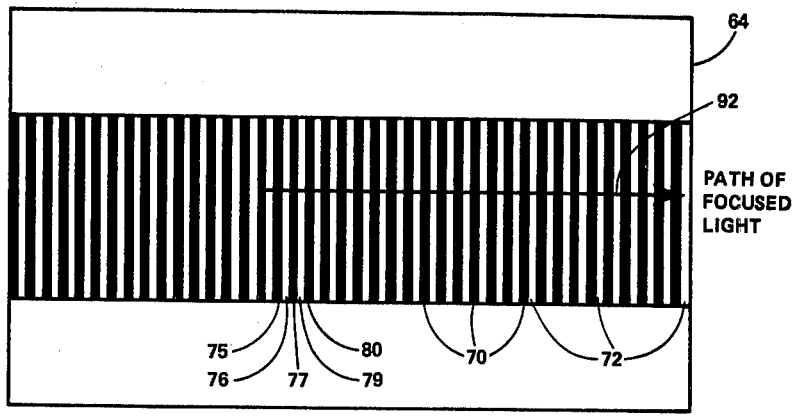
FIG. 5 is an enlarged front view of a optical grading as used in the present invention.
Figure 2:
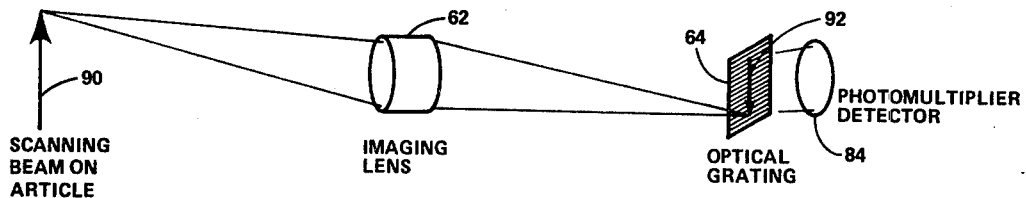
FIG. 2 is a diagrammatic view of light reflected from an article through an imaging lens and onto an optical grating of the present invention.

An enlargement of the optical grating 64 is shown in FIG. 5. Briefly the optical grating is provided with a plurality of alternately opaque bars 70 and transparent bars 72. The bars are longitudinaly parallel and of the same width. However, the transparent bars might be of a larger or smaller width than the opaque bars. An opaque bar 75 is adjacent to a transparent bar 76 which in turn is adjacent to an opaque bar 77. Bar 77 is followed by a transparent bar 79 which in turn is followed by an opaque bar 80. Thus, the opaque bars 75, 77, and 80 alternate with the transparent bars 76 and 79. In FIG. 2, a photomultiplier detector 84 is located behind the optical grating and receives the reflected light focused by imaging lens 62 after passing through the transparent bars of the optical grating 64. The opaque bars 70, of course, do not pass the light collected by the imaging lens 62. The imaging lens 62 demagnifies a portion of the light of scanning beam 35 reflected from article 30 and focuses that light onto optical grating 64 such that the size of the collected light is less than the width of the opaque and transparent bars. If the opaque and transparent bars of the optical grating are not of the same width the spot focused by the imaging lens onto the optical grating should be of a diameter less than the width of the opaque bars. The reflected light which is collected by the imaging lens after passing through the optical grating 62 causes the output of detector 84 to vary in accordance with the amount of light which is passed by the optical grating thereinto. The output of detector 84 is received by processor 42 through line 86 as shown in FIG. 1.

As shown in FIG. 2, as the scanning beam moves in the direction of arrow 90 and the imaging lens 62 collects and demagnifies the light reflected from the article, a spot of light on the optical grating moves in the direction of arrow 92. The detector 84 receives the collected light from the imaging lens 62 which passes through the transparent bars of the optical grating 64. For reasons to be discussed here below, it is desirable that the spot of light focused by imaging lens 62 onto the optical grating 64 traverses or moves across the optical grating in a direction perpendicular to the longitudinal orientation of the opaque and transparent bars. As shown in FIG. 5, arrow 92 is perpendicular to the longitudinal axis of the opaque and transparent bars. Other geometrical shapes and arrangements of opaque and transparent bars are possible and the spot need not necessarily travel across the optical grating perpendicular to the arrangement of opaque and transparent bars; however, the complexities of the problem of processing the signal produced by the photomultiplier detector under those conditions is greatly increased.

Because it is desirable for the spot of collected light from the imaging lens to move across the optical grating perpendicular to the bars thereon the scanning beam must move across or transverse the article in a direction perpendicular to the longitudinal axis of the optical grating. Other arrangements, of course, are possible. For example, a mirror could be placed behind the imaging lens and the optical grating positioned to intercept the light reflected from the mirror. The essential relationship between the direction of motion of the scanning beam and the optical grating is that as the scanning beam moves across the article, the spot of collected light from the imaging lens moves across the optical grating perpendicular to the bars thereon.

Figure 3:
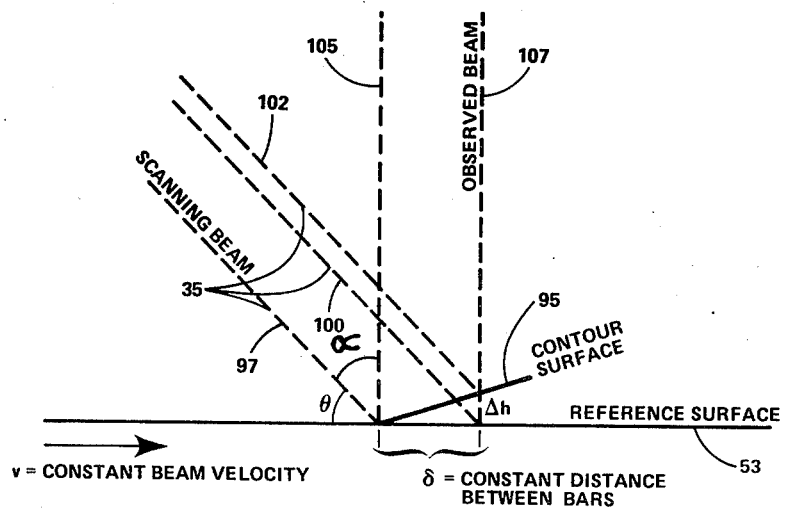
FIG. 3 is a graphic view of the relationship between the scanning beam, the reference surface, the surface contour of the article to be measured, and the reflected light to be collected by the imaging lens.

Measurement of the height of object 30 is accomplished by using the principle of triangulation as illustrated in FIG. 3. As shown the scanning beam 35 intersects the reference surface 53 at an angle $\theta$. The scanning beam moves at a constant velocity, V, across the reference surface so that the time interval, $\Delta t$, for the beam to travel a certain predetermined distance $\delta$ is constant. If $\delta$ represents the distance which the scanning beam is required to move in order that the spot of collected light on the optical grating moves the distance between two successive transparent bars, then $\Delta t$ equals $\delta/V$ is the time interval between successive pulses at the output of detector 84. If a contour surface 95 is placed over the reference surface 53, as would be the case for an object such as article 30 placed within the track of the scanning beam, the timing of the pulses changes. Prior to the placement of the contour surface 95 on reference surface 53 the scanning beam which began at line 97 would traverse the distance $\delta$ when it is positioned at line 100. However, after the placement of the contour surface 95 the beam does not traverse the observed distance $\delta$ until it is at the position shown by line 102. With the contour surface 95 intervening, as shown, the time interval, $\Delta t$, is longer because the beam must travel over the contour surface 95 until it is at the position shown by line 102 to traverse the distance $\delta$. Thus, due to the geometry, a change in the height of the contour surface leads to a change in the time interval between successive pulses at the output of the detector. In other words, the differences in time intervals between peaks of the output of the photomultiplier detector 84 represent changes in the contour of the article. By knowing how long it takes the spot of collected light to traverse between transparent bars of the optical grating and knowing the velocity of the scan, it is possible to chart the rise and fall of the contour of the article.

The height change, $\Delta h$, between observation points is given by the following linear relationship: $\Delta h = (V\Delta t - \delta) \tan \theta$. The total height of any point on the contour relative to the reference surface is the sum of all the prior height changes, $\Delta h$, up to that particular point:

$$h_i = \sum_{j=1}^{i} (V\Delta t_j - \delta) \tan \theta.$$

It should be noted at this point that since the surface velocity of a scanning beam by a rotating mirror is not constant, the height calculated must be compensated therefore as follows: $V = \dot{\alpha} H \sec^2 \alpha$ where $\dot{\alpha}$ is the derivation of $\alpha$ with respect to time $(d\alpha/dt)$ and H is the height of the scan mirror above the reference surface and $\alpha$ is the instantaneous mirror angle reference to the vertical if the reference surface is horizontal. The axis of the reflected light beam, which is collected and focused, by imaging lens 62 for the position of the scanning beam shown by line 97 is represented by line 105 and for lines 100 and 102 by line 107.

Figure 4:
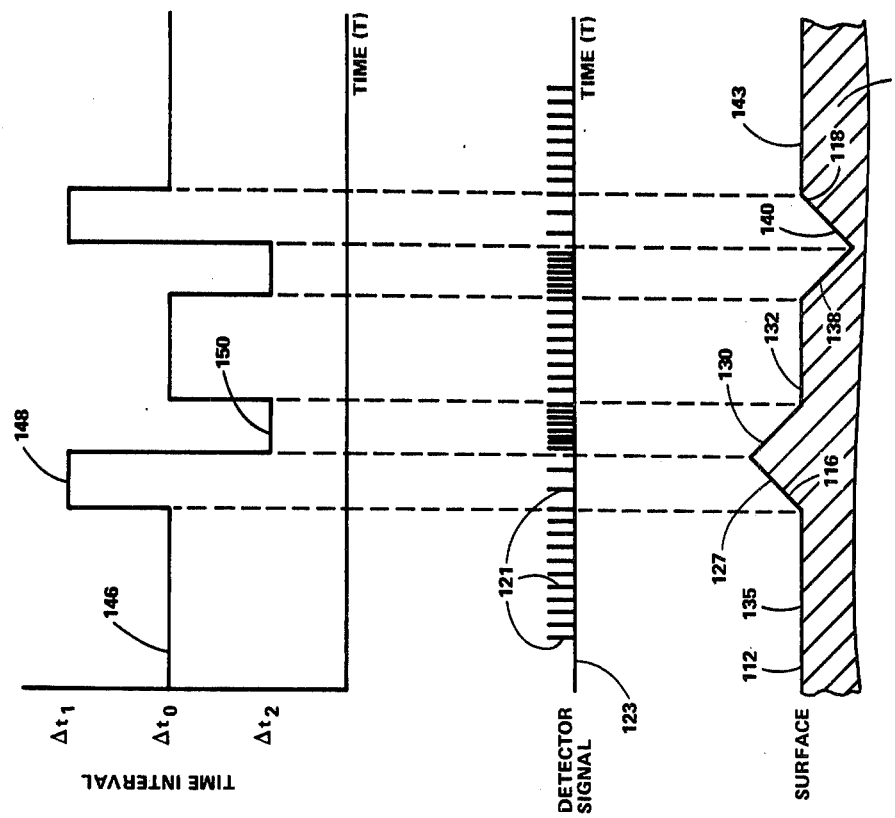
FIG. 4 is a graph showing the relationship between the surface contour being scanned and the information received and processed by a processor.

FIG. 4 shows a contoured surface 112 of an article 115 having both a triangular protrusion 116 and a similarly shaped indentation 118. As the scanning beam traverses across the surface beginning at the left (as shown in FIG. 4), the detector peaks as represented by the spikes 121 on line 123 are evenly spaced. As the beam traverses the outward extending side 127 of protrusion 116, the spikes 121 are more widely spaced. As the scanning beam traverses the inward extending edge 130 of protrusion 116, the spikes 121 are closer together. As the scanning beam moves across portion 132 of surface 112 which is parallel to portion 135 of surface 112 the spikes for those two portions are similarly spaced.

As the scanning encounters the inwardly extending edge 138 of indentation 118 the spikes are more closely spaced and as the scanning beam traverses the outwardly extending edge 140 of indentation 118, the spikes are further apart. As the scanning beam traverses the portion 143 of surface 112 which is parallel to portion 135 the spikes have similarly spacings as compared to the spacings of the spikes produced by surface 135. Curve 146 displays the changes in the time intervals between the spikes 121 of line 123. For example, where the spikes are more widely spaced for the outwardly extending edge of protrusion 116 the time interval $\Delta t1$ shown by the portion 148 of curve 146 is increased. And correspondingly $\Delta t2$ shown by portion 150 of curve 146 which represents the inwardly extending edge 130 of protrusion 116. Thus, the time intervals can be interpreted or processed to give an accurate representation electronically of the surface contour encountered by the scanning beam by analyzing the differences between time intervals of the spikes 121 representing the selected points of the detector signal or output. Increasing accuracy is obtained if there are a great many time intervals determined relative to the changes in contour of the surface.

It should be readily apparent to those skilled in the art that three dimensional electronic images of articles can be produced by utilizing the above described method and apparatus by moving the object perpendicular to the sweep of the scanning beam across the object and repeatedly scanning the article as the article moves perpendicular to the track of the scanning beam. Articles which are larger than the distance between points 56 and 58 (FIG. 1) can be scanned by placing a portion of the article between the points 56 and 58 then moving the article perpendicular to the track of the scanning beam, and then placing a portion of the article not scanned previously and moving the article perpendicular to the track of the scanning beam. Thus, the article can be divided into strips approximately the size of the distance between points 56 and 58 (FIG. 1) and repeatedly moved perpendicular to the track of the scanning beam. The movement of the article and the scanning beam combine to form a raster type scan. Each strip which the article is divided into can then be moved through the track of the scanning beam perpendicular thereto until all of the strips have been scanned. Thus, a complete three dimensional contour of an article larger than the area of the scanning beam can be assembled. In order that the three dimensional image is assembled properly in a storage unit, the rate at which the article is moved relative to the track of the scanning beam must be known.

As shown in FIG. 1, processor 42 receives the output of detector 84 and utilizes the information therein to determine the time interval between certain predetermined points on that output. Those points could be the peaks of the output of the detector or where the sign of the AC component of the output changes sign either from plus to negative or negative to plus. The output of processor 42 can be stored in any type of storage unit 155 as well known in the art such as a RAM or a disk unit. The storage unit could be adapted to receive the output of the processor a scan at a time as determined by the output of the scanning mirror. As the article 30 is moved relative to the track of the scanning beam a three dimensional image would be constructed and available within the storage unit 155. Simultaneous with the storing of the output of processor 42 or at a later time a computer means 157 could seek out certain selected features of the contour of the article as stored in a storage 160. Further, a three dimensional image of a master article could be stored in the storage unit 160 and compared with the output of processor 42 to determine if the article being scanned or whose image is stored in storage unit 155 have the same contours. Thus, the device is capable of inspecting an article and comparing that article to a stored master article to determine if the article being scanned and the master article have the same contours within certain predetermined parameters. An output or display unit 162 can be provided for visual display of the output of processor 42.

A major design consideration is the geometry between the projected beam, and the imaging lens, optical grating and detector system. The scanning beam must be projected toward the article at a different angle from the angle at which the imaging lens collects the reflected light in order to accomplish the triangulation discussed above. In general, the angle must be a compromise which should be approximately 45°. The angle referred to is the angle between the central angle of the scan and the axis of the reflected light collected by the imaging lens. The angle of 45° is desirable because smaller angles cause the time differential between pulses to decrease which in turn makes processing more difficult and because larger angles connote that only very shallow contours can be measured. Thus, as the angle between the scanning beam and the axis of the reflected light being collected by the imaging lens decreases, the time interval between those certain predetermined points discussed above on the output of the detector becomes more difficult to measure with accuracy. As the angle between the scanning beam and the central axis of the light collected by the imaging lens increases only shallow contours can be measured because higher intervening features on the article can mask contours away from the intervening feature. Although the accuracy of height measurements increases as the angle increases only shallow contours can be measured. The height accuracy is a tangential function and deteriorates rapidly at small angles, is relatively constant in the middle range, and improves for larger angles. Therefore, it has been found that a good compromise is to align the scanning mirror so that the central angle of its scan (or the angle halfway between the extreme ends of the scan) is approximately 45° from the observation angle of the imaging lens.

Figure 6:
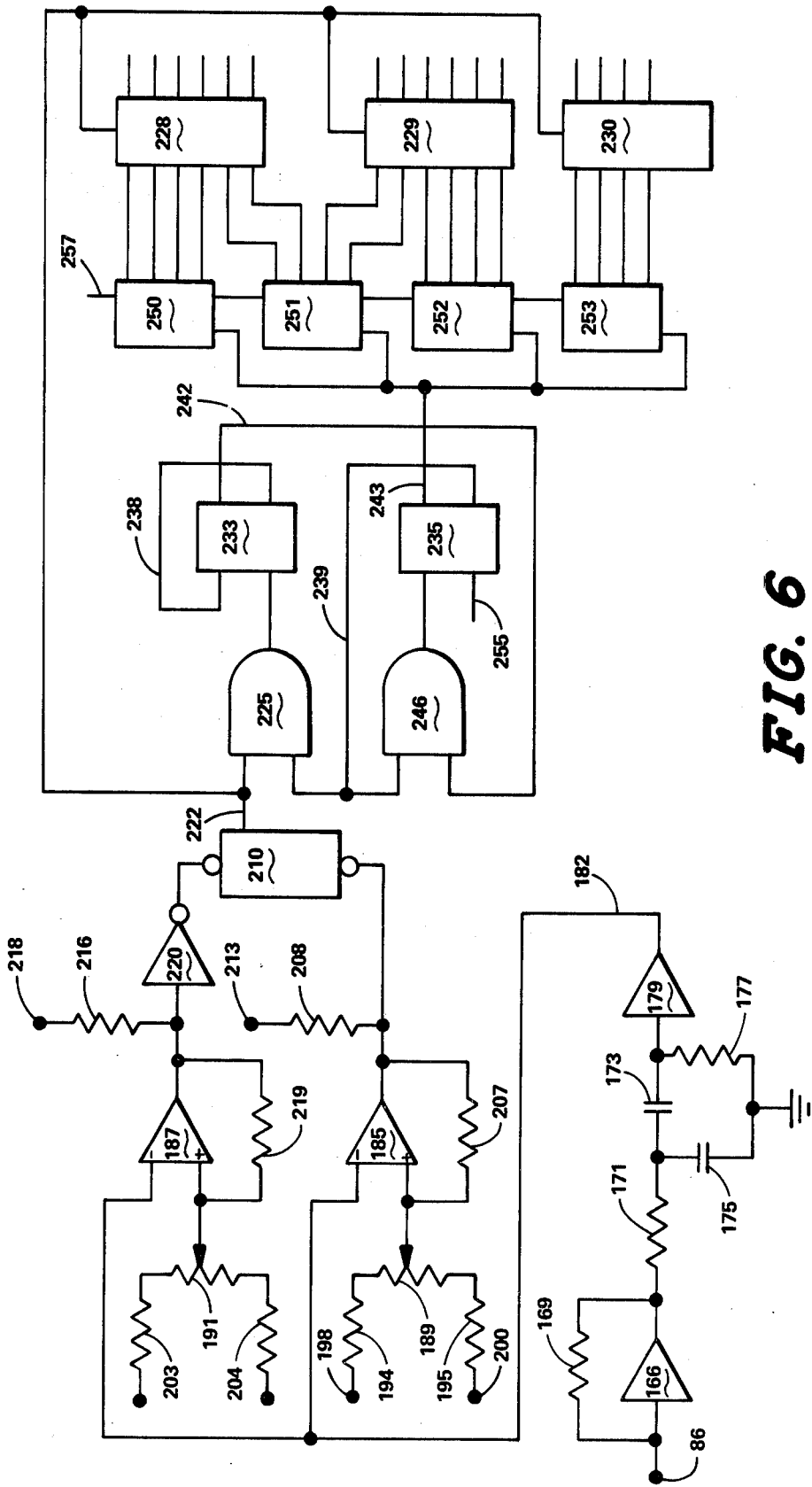
FIG. 6 is a schematic diagram of the point and time interval determination portions of the processor of FIG. 1.

A portion of processor 42 is shown in FIG. 6. The output of detector 84 is received by an amplifier 166 through line 86. The output of amplifier 166 is connected to resistors 169 and 171. Resistor 169 is also connected to the input of amplifier 166 providing a feedback loop. The other side of resistor 171 is connected to capacitors 173 and 175. The other side of capacitor 175 is connected to ground and the other side of capacitor 173 is connected to a resistor 177 and an amplifier 179. The other side of resistor 177 is also connected to ground. Capacitors 173 and 175, resistor 177, and amplifier 179 act as a band pass filter with a result that the output of amplifier 179 to line 182 is the AC component of the signal on line 86 with attenuated high frequency components. Line 182 connects the output of amplifier 179 to the negative inputs of comparators 185 and 187. The positive inputs of comparators 185 and 187 are connected to the pick-off terminals of potentiometers 189 and 191, respectively. Potentiometer 189 is connected to intermediate resistors 194 and 195. The other ends of resistors 194 and 195 are connected through terminals 198 and 200 to voltage sources. The arrangement of the circuitry is such that it is possible by adjusting potentiometer 189 to obtain a value close to zero volts. For example, terminals 198 and 200 could be connected to positive 15 volts and minus 15 volts, respectively, with resistors 194 and 195 of equal values. This same arrangement could also be used in connection with potentiometer 191 and its associated resistors 203 and 204.

The output of comparator 185 is connected to resistors 207 and 208, and to the pre-set input of D-flip-flop 210. The other side of resistor 207 is connected to the positive input of comparator 185, and the other side of resistor 208 is connected to a positive 5 volts DC on terminal 213. The output of comparator 187 is connected to resistors 216 and 219, and to the clear input of flip-flop 210 through inverter 220. A 5 volt DC voltage is provided on terminal 218. Flip-flop 210 is constructed so that after its clear inputs goes low its output to line 222 goes high. After its pre-set input, which is connected to comparator 185, goes low the output of flip-flop 210 to line 222 goes low.

Potentiometer 189 is manually set so that the output of comparator 185 is low if the input on line 182 is just below zero. Potentiometer 191 is manually set so that comparator 187 is high if the signal on line 182 is just above zero. The threshold points of the comparators 185 and 187 are not set to zero because if they were set to zero their output might reflect the noise in the system, and thus give improper indications to the flip-flop 210. Line 222 from flip-flop 210 is connected to AND GATE 225, and latches 228 through 230. The output of AND GATE 225 is connected to the clock input of flip-flop 233. The other input to AND GATE 225 is from an output of flip-flop 235. Flip-flops 210 and 233 and 235 are D type flip-flops. Prior to operation of the processor, flip-flops 233 and 235 have been set with their outputs to lines 238 and 239, respectively, set high. The outputs of flip-flops 233 and 235 to lines 242 and 243 respectively, are set low. Line 238 is connected to the D input of flip-flop 233. Line 239 is connected not only to AND GATE 225 but also to AND GATE 246. The other input to AND GATE 246 is from flip-flop 233 through line 242. The output of AND GATE 246 is connected to the D input of flip-flop 235.

The output of flip-flop 235 is connected through line 243 to the clear inputs of counters 250 through 253. The clock input of flip-flop 235 is connected to an appropriately fast clock pulse through line 255 as is the enable input of counter 250 through line 257. The clock pulse on lines 255 and 257 should be of a higher frequency than the output of the photomultiplier detector 84 on line 86. The carry output of counter 250 is connected to the enable input of counter 251. The carry and enable inputs of counters 251 through 253 are connected in a similar manner. The outputs of counters 250 through 253 are connected to the inputs of latches 228 through 230. The six inputs of shift register 228 are connected to the four outputs of counter 250 and to the two least significant bits of counter 251. The two most significant bits of counter 251 are connected to shift register 229 and the four outputs of counter 252 are also connected to shift register 229. The outputs of counter 253 are connected to the inputs of shift register 230.

When the input to comparator 187 is slightly above zero, the output of the comparator changes from zero to plus 5 volts which causes inverter 220 to change its output from high to low. The output of flip-flop 210 to line 222 goes high which causes AND GATE 225 to go high. Because the clock input of flip-flop 233 goes from low to high and the signal to the D input of flip-flop 233 is high, its output to line 242 goes high and its output to line 238 goes low. Both inputs to AND GATE 246 are now high and the output AND GATE 246 goes high. During the next low to high transition of the clock pulse on line 225 the output of flip-flop 235 to line 243 goes high. Also, the output of flip-flop 235 to line 239 goes low. Because one of the inputs to AND GATE 246 is low the output of AND GATE 246 goes low and during the next low to high transition the clock pulse flip-flop 235 toggles its outputs with its output to line 239 high and to line 243 low. While line 243 is high counters 250 through 253 are reset to zero. The clock pulses on line 257 are then counted from zero.

When the output of flip-flop 235 to line 243 goes high and its output to line 239 goes low, AND GATE 246 goes low. During the next low to high transition of the clock pulse the output of flip-flop 235 to line 239 goes high. The high output of line 239 and the high signal on line 222 cause AND GATE 225 to go high and, therefore, the output of flip-flop 233 to line 238 goes high and its output to line 242 goes low. After the signal on line 182 has reached its positive peak and is again slightly above zero the output of comparator 187 again goes to zero which causes the output of inverter 220 to go high but the output of flip-flop to line 222 remains high. When the signal on line 182 goes slightly below zero comparator 185 goes low and the output flip-flop 210 to line 222 goes low. After the output on line 222 goes low, the output of AND GATE 225 goes low and the logic network is again ready to receive the low pulse from inverter 220. After the signal on line 182 is again going positive and is slightly above zero the output of comparator 187 again goes high, and the output of inverter 220 again goes low. The output of flip-flop 210 to line 222 goes high. The count present in counter 250 through 253 is loaded in latches 228 through 230 when the output of flip-flop 210 to line 222 goes high. The output of AND GATE 225 goes high and causes flip-flop 233 to toggle its output as discussed above.

The count available at the outputs of shift registers 228 through 230 represents the time interval between predetermined points on the signal on line 182 which in turn directly relates to the signal on line 86 from the detector 84. It should be readily apparent to those skilled in the art that it is desirable to have the clock pulse on line 257 to be of a significantly higher frequency than the frequency of the signal on lines 86 and 182 so that changes in the time interval can be accurately detected by examining the counts shifted through shift registers 228 through 230.

Thus, the output to the remainder of the processor of shift registers 228 through 230 provides information concerning the time interval between selected points on the signal from detector 84. This allows the contour of an article to be measured accurately (as discussed above). It should be noted that the time interval is measured in such a manner as not to be significantly dependent of the magnitude of the detector's output.

In operation, the measuring system as shown in FIG. 1 has a laser beam directed at a scanning mirror. A telescope is positioned between the coherent light source and the scanning mirror to focus the laser beam onto an article. Referring to FIG. 1, the scanning mirror 27 converts the focused beam 32 into a scanning beam 35 which traverses or tracks across the article. Reflected light from the article is collected and focused by an imaging lens onto an optical grating 64. A detector behind the optical grating receives the light which passes through transparent bars in the optical grating. The output of the detector varies as the magnitude of the light passing through the transparent bars of the optical grating varies. A processor 42 converts the output of the detector 84 to a digital output which varies directly with the time interval variations between predetermined points of the output of the detector. As the scanning beam moves up a contour, the time intervals increase. As the scanning beam moves down a contour, the time intervals decrease. Thus, it is possible to accurately determine the contour of an article by examining the time intervals. For certain applications it is desirable to maintain a record of the changes in height so that the height of a particular point on a scan can be determined as well as the slope of the contour at any point which the differences in time interval give directly. The system disclosed herein has been found to be accurate for a single point within 0.002 inches. Contour changes on the order of 0.001 inch/0.025 inches over a number of points can be accurately measured.

In the system of the present invention a laser beam is scanned at known rate across an article. The light reflected from the article is collected and focused by at least one imaging lens. More than one imaging lens and optical grating could be utilized for certain applications if desired. In such an application the plurality of imaging lenses and optical gratings could be utilized with the outputs of the detectors associated with each optical grating being merged or compared within the processor.

By unique structural arrangement illustrated herein there is provided a contour measuring system whose accuracy is relatively unaffected by the reflectivity of the object. The reflected light collected by the imaging lens is focused thereby onto an optical grating having alternately transparent and opaque bars. As the light moves across the optical grating from a transparent bar onto an opaque bar and so forth, the output of the detector located behind the optical grating varies. The time interval between selected points on the output of the detector is accurately determined by an electronic counter. The electronic counter is responsive to certain points on the output of the detector such as the positive peak, the transition of the AC portion of the output from negative to positive etc.

Having described the invention in connection with a specific embodiment thereof, it is to be understood that further modifications may now suggest themselves to those skilled in the art, and it is intended to cover such modifications as fall within the scope of the appended claims.

What is claimed is:

1. A laser system for measuring surface contours of an article wherein a laser beam is scanned across the article and light reflected from the surface of the article passes through an optical system onto an optical detector, characterized by: an optical grating interposed between the optical system and the optical detector in a manner so that the light reflected from scanned areas of the article pass through the optical grating, and reflections from areas of different or changing rate of contour pass through the optical grating at different time intervals; and means for measuring the time interval data of light passing through the grating to determine areas of different contours.

2. The system according to claim 1 further characterized by: means storing data indicative of reflections from a flat reference surface and means for comparing the stored reference data and the measured time interval data produced from scanning a contoured surface to determine the contour of the scanned surface.

3. The system according to claim 1 characterized in that the optical grating has alternate transparent and opaque bars which are of substantially identical width.

4. A method for determining the height of certain points on an article wherein said article is scanned by a coherent light beam and reflection of light representative of points on said article are passed through an optical system to a detector; characterized by the steps of interposing an optical grating having alternate transparent and opaque regions therein between the optical system and the detector, counting the interval of time between reflections passing through the transparent regions on said grating and comparing the intervals against a standard to determine the height of the points on said article.

5. The method according to claim 4 further characterized by storing the counted time intervals between reflections and after comparing them against a standard determining the contour of the article.

* * * * *